3,514,420
FLUOROCARBON COMPOUNDS AND POLYMERS THEREOF

Atsuo Katsushima, Fuse-shi, Iwao Hisamoto, Suita-shi, and Shoshin Fukui, Takahisa Kato, and Masayuki Nagai, Osaka-fu, Japan, assignors to Daikin Kogyo Kabushiki Kaisha, Osaka-shi, Japan, a juridical of Japan
No Drawing. Continuation-in-part of application Ser. No. 515,206, Dec. 20, 1965. This application Apr. 11, 1967, Ser. No. 629,910
Claims priority, application Japan, Apr. 15, 1966, 41/23,932
Int. Cl. C07c 69/54; C08f 3/64, 47/18
U.S. Cl. 260—29.6                                           14 Claims

---

ABSTRACT OF THE DISCLOSURE

A fluorocarbon compound having the formula:

$$R_fCH_2CH(CH_2)_nOOC(CH_2)_pCR=CH_2$$
$$(CH_2)_mOH$$

wherein $R_f$ is a perfluoroalkyl group of 3–21 carbon atoms, R is hydrogen or methyl, m is an integer of 0–10, n is 0 when m is an integer of 0–10 and an integer of 1–10 when m is 0, and p is an integer of 0–10; and polymers of said fluorocarbon compounds, being useful as oil-repellent agents.

---

This application is a continuation-in-part of applicants' copending application Ser. No. 515,206, filed Dec. 20, 1965, and now abandoned.

This invention relates to a new and useful class of fluorocarbon compounds and their polymers; and to aqueous emulsions or organic solvent solutions thereof suitable for treating solid materials, such as, fibrous or porous materials to render them oil-repellent.

The new compounds are esters having the general formula:

$$R_fCH_2CH(CH_2)_nOOC(CH_2)_pCR=CH_2$$
$$(CH_2)_mOH \qquad (1)$$

wherein $R_f$ is a normal or branched perfluoroalkyl group having from 3 to 21 carbon atoms; m is an integer of from 0 to 10; n is 0 when m is an integer of from 1 to 10 or an integer of from 1 to 10 when m is 0; p is an integer of from 0 to 10; R is hydrogen or methyl group.

The esters of this invention include two types of esters having different structure, one of which has a hydroxyl group attached to a secondary carbon atom and another has a hydroxyl group attached to a primary carbon atom, as shown in the following formulas:

$$R_fCH_2CH(CH_2)_{m'}OOC(CH_2)_pCR=CH_2$$
$$OH \qquad (I-A)$$

$$R_fCH_2CHOOC(CH_2)_pCR=CH_2$$
$$(CH_2)_{m'}OH \qquad (I-B)$$

(wherein $R_f$, p and R are as defined before and m' is an integer of 1 to 10).

The esters of the invention, both of the above Formulas I–A and I–B, can be readily polymerized to produce solid polymers which have oleophobic properties and are useful as oil-repellent agents.

The esters of this invention can be prepared by various methods and in accordance with the process for the preparation and reaction conditions applied one or both of the esters having the above Formulas I–A and I–B can be obtained. For example, the esters of the Formula I–A are obtainable selectively by reacting fluorinated haloalkanols with alkali metal salts of unsaturated aliphatic carboxylic acids, as shown in the following equation:

$$R_fCH_2CHX(CH_2)_{m'}OH + CH_2=CR(CH_2)_pCOOM \longrightarrow$$
$$R_fCH_2CH(CH_2)_{m'}OOC(CH_2)_pCR=CH_2 + MX$$
$$OH \qquad \text{(Process I)}$$

where $R_f$, R, m' and p are as defined before, X is a halogen other than fluorine, preferably bromine or iodine, and M is an alkali metal.

The reaction (Process I) is usually carried out in an organic liquid which is inert to the reactants and products. The usual organic liquids are, for example, saturated or unsaturated aliphatic monohydric alcohols having 3 to 10 carbon atoms such as isoamylalcohol, butylalcohol, tertiary butylalcohol, secondary butylalcohol, heptylalcohol, hexylalcohol, octylalcohol, nonylalcohol, allylalcohol, crotylalcohol, etc.; fluorinated aliphatic alcohols such as $H(CF_2CF_2)_vCH_2OH$, v being an integer from 1 to 4, etc.; and ethers such as dioxane, tetrahydrofuran, anisole, polyoxypropylene, polyoxyethylene, etc. The reaction temperature at which the process is carried out is not critical and will usually be between about 80° C. and 200° C., although 90° C. to 150° C. is preferred. The reaction pressure also is not critical and varies over a wide range, but usually an autogeneous pressure is applied, and if an organic solvent of sufficiently high boiling point is employed, the process may be carried out in an open vessel under atmospheric pressure. One or more of polymerization inhibitors, such as, copper powder, hydroquinone, amines, etc., may be added to the reaction system so as to prevent the polymerization of the starting unsaturated carboxylic acid salts and the resultant esters. In general, the presence of water in the reaction system should be avoided as an undesirable dehydrohalogenation reaction may occur.

Further, the esters of this invention can be prepared by reacting fluorinated epoxy compounds with unsaturated aliphatic carboxylic acids, as shown in the following equation, and in accordance with the reaction conditions applied the esters of the Formula I–A are produced selectively or in mixture with the esters of the Formula I–B:

$$R_fCH_2CH(CH_2)_{m'-1}CH_2 + CH_2=CR(CH_2)_pCOOH \longrightarrow$$
$$\underset{O\underline{\qquad\qquad}}{}$$

$$R_fCH_2CH(CH_2)_{m'}OOC(CH_2)_pCR=CH_2$$
$$OH$$

or $\longrightarrow R_fCH_2CH(CH_2)_{m'}OOC(CH_2)_pCR=CH_2 +$
$$OH$$
$$R_fCH_2CHOOC(CH_2)_pCR=CH_2$$
$$(CH_2)_{m'}OH$$

(Process II)

wherein $R_f$, R, m' and p are as defined before.

The reaction (Process II) may be carried out in the presence of organic liquids, which are inert to the reactants and products, such as tetrachlorodifluoroethane, ω,α,α-trihydroperfluoroalcohol-1, petroleum ether, toluene, etc., or in the absence of such solvents. The reaction temperature is not critical and will usually be between about room temperature and 200° C., desirable being 50° C. to 150° C. The reaction pressure also is not critical, but usually an atmospheric or autogeneous pressure is applied. To accelerate the reaction an accelerator may be added to the reaction system in the range of 0.1 to 30 weight percent, based on the weight of the starting unsaturated carboxylic acid used. Such accelerators include for example, sodium hydroxide, potassium hydroxide, sodium carbonate, potassium carbonate, benzyldimethyl amine, triethyl amine, boron trifluoride, ether complex of boron trifluoride, concentrated sulfuric acid, phosphorus pentoxide, etc.

When the reaction is carried out in the absence of an accelerator or in the presence of an acidic accelerator there are produced esters of the Formulas I-A and I-B simultaneously without selectivity, while when a basic accelerator is used the esters of the Formula I-A are produced selectively. To prevent undesirable polymerization of the reactants and the products, the polymerization inhibitors used in Process I may be added to the Process II reaction system.

The desired esters of this invention can be separated from the resultant reaction mixture of Process I or Process II by conventional methods such as by rectification of the mixtures containing polymerization inhibitors which have been added before or after the reaction as required. The esters having a high boiling point may be separated by reprecipitation or recrystallization.

The starting fluorinated haloalkanol, having a formula of $R_fCH_2CHX(CH_2)_{m'}OH$, used in the Process I can be easily synthesized by single reaction of a perfluoroalkyl halide $(R_fX)$ or of a perfluorosulfonyl halide $(R_fSO_2X)$ with an unsaturated alcohol $CH_2=CH(CH_2)_{m'}OH$. These reactions are illustrated by the following equations:

(1) $R_fX + CH_2=CH(CH_2)_{m'}OH \rightarrow$
$$R_fCH_2CHX(CH_2)_{m'}OH$$

or (2) $R_fSO_2X + CH_2=CH(CH_2)_{m'}OH \rightarrow$
$$R_fCH_2CHX(CH_2)_{m'}OH$$

wherein $R_f$, X and $m'$ are as defined before. Conventional free-radical catalysts, such as, peroxides or organic azo compounds, are advantageously used for said reactions. A detailed explanation of these reactions is given hereinafter in Example 1 and Example 11.

The compounds, $R_fX$ and $R_fSO_2X$ and $$CH_2=CH(CH_2)_{m'}OH,$$

are known in the art. The compound, $R_fX$, is readily prepared by telomerization reaction of tetrafluoroethylene with a compound such as

etc., and described in the literature: U.S.P. No. 3,883,238, U.S.P. No. 3,156,732, etc. The compound, $R_fSO_2X$, is easily derived from $R_fSO_2F$ prepared by electrolytic fluorination of the corresponding aliphatic sulfonyl halide.

The starting compounds used in the Process II are easily obtainable by merely treating fluorinated haloalkanol $R_fCH_2CHX(CH_2)_{m'}OH$ with an aqueous solution of alkali, such as sodium hydroxide, at room temperature or elevated temperature. The detailed explanation of this reaction is given hereinafter in Example 15.

The number of carbon atoms in the perfluoroalkyl group $(R_f)$ contained in the molecules of the present esters should be confined to from 3 to 21, preferably from 4 to 13, whereby said esters can be easily produced and the polymers prepared from said esters display excellent oleophobic properties. The perfluoroalkyl group $(R_f)$ includes normal or straight-chain perfluoroalkyl groups $F(CF_2)_q-$ and branched-chain perfluoroalkyl groups such as

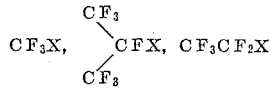

wherein $q$ is an integer of from 3 to 21 and $q'$ is an integer of from 0 to 18, although esters containing a perfluoroalkyl group of

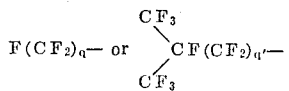

are preferred. Particularly desired esters of this invention are those having the formula of

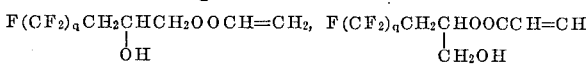

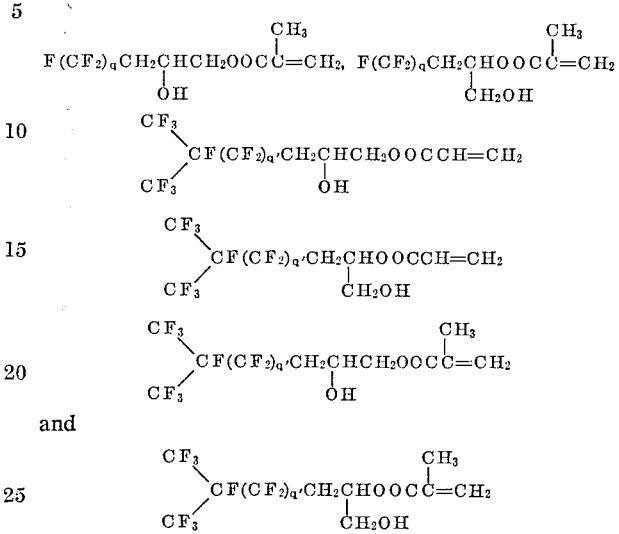

and

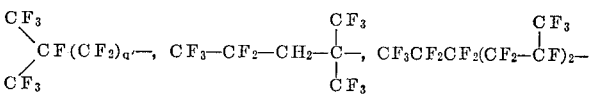

Representative esters of this invention are exemplified as follows:

(1) 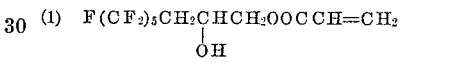

(2) 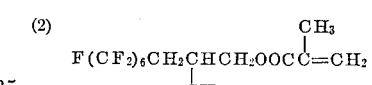

(3) 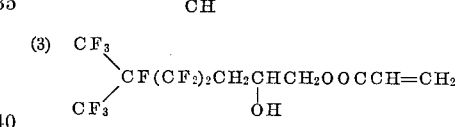

(4) 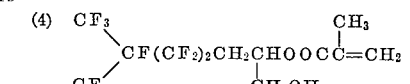

(5) 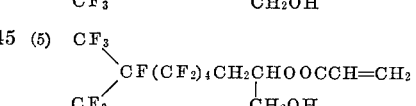

(6) 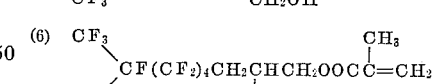

(7) 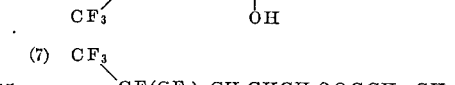

(8) 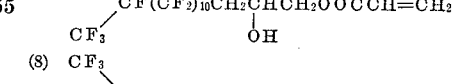

(9) 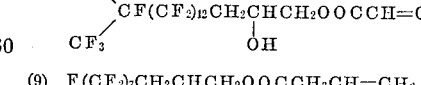

(10) 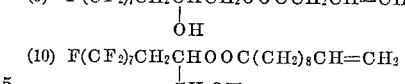

(11) 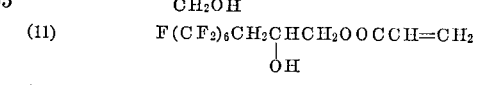

(12) 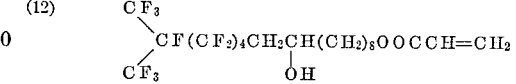

(13) 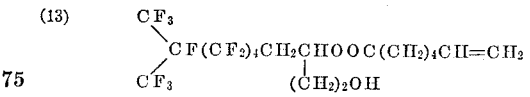

The esters of this invention, including esters of the Formulas I-A and I-B, are readily polymerized by the methods known to art, for example, by bulk polymerization, solution polymerization, emulsion polymerization and suspension polymerization, using either heat, free-radical or ionic catalysts, ultraviolet rays or ionizing radiation. The esters may be polymerized either individually or in admixture with each other or with polymerizable monomers of other kinds which contain an ethylenic linkage in the molecules, to produce novel homopolymers or copolymers of this invention. The copolymerizable monomers include (1) acrylic acid, methacrylic acid or such esters thereof as methyl, ethyl, butyl, isobutyl, propyl, 2-ethylhexyl, hexyl, decyl, lauryl, stearyl, glycidyl, etc.; (2) vinyl esters of aliphatic acids such as vinyl acetate, vinyl propionate, vinyl caprylate, vinyl laurate, vinyl stearate, etc.; (3) styrene or styrene compounds such as α-methylstyrene, p-methylstyrene, etc.; (4) halogenated vinyl or halogenated vinylidene compounds such as vinyl fluoride, vinyl chloride, vinyl bromide, vinylidene fluoride, vinylidene fluoride, vinylidene chloride, etc.; (5) allyl esters of aliphatic acids such as allyl heptanoate, allyl caproate, allyl caprylate, etc.; (6) vinylalkyl ketones such as vinylmethyl ketone, vinylethyl ketone, etc.; (7) acrylamides such as N-methyl acrylamide, N-methylol acrylamide, etc.; (8) diene compounds such as butadiene, 2,3-dichloro-1,3-butadiene, isoprene, etc.; and (9) fluorinated unsaturated esters such as $R_f(CH_2)_rOOCCR=CH_2$,

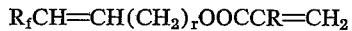

(wherein $R_f$ and R are as defined before, r is an integer of from 1 to 10), etc. A copolymer of 99 to 25 weight percent of the ester monomers of the present invention and 1 to 75 weight percent of comonomer containing no fluorine in the module, i.e., comonomers (1) to (8) above, exhibits sufficient oil-repellency, although a copolymer containing less than 25 weight percent of the ester monomers of the present invention exhibits poor or no oil-repellency.

Of the polymerization methods as stated before, the most desirable one is an emulsion polymerization for which conventional techniques used in the emulsion polymerization of vinyl compounds are applicable. For instance, one or more species of the ester monomers of the present invention to be polymerized are dispersed in an aqueous medium having dissolved therein dispersants and free-radical catalysts, if necessary, and polymerized. The dispersants employed include anionic, cationic or non-ionic surfactants. The desirable anionic surfactant is a sodium salt of sulfated alkenyl ($C_{16}$ to $C_{18}$) acetate, sodium oleate, sodium salt of sulfated methyloleate, an ammonium ω-hydropolyfluoroalkanoate ($C_7$ to $C_{13}$), an ammonium perfluoroalkanoate ($C_5$ to $C_{13}$), a sodium alkyl ($C_{10}$ to $C_{18}$) sulfate, a sodium alkyl ($C_{12}$ to $C_{18}$) naphthalene, or a sodium alkyl ($C_{12}$ to $C_{18}$) naphthalenesulfonate, etc. The desirable cationic surfactant is (dodecylmethylbenzyl)-trimethylammonium chloride, benzyldodecyldimethylammonium chloride, N-2-(diethylamino)-ethyl-oleamide hydrochloride, dodecyltrimethylammonium acetate, trimethyltetradecylammonium chloride, octadecyl dimethyl ammonium acetate, etc. The desirable non-ionic surfactant is a condensate of polyethylene oxide and hexylphenol, isoctylphenol, hexadecanol, oleic acid, alkane ($C_{12}$ to $C_{16}$) thiol, or an alkyl ($C_{12}$ to $C_{18}$) amine.

The free-radical catalysts employed include those compounds known to the art for the polymerization of conventional vinyl compounds, for example, benzoyl peroxide, lauroyl peroxide, tertiarybutyl perbenzoate, 1-hydroxyclyclohexylhydro peroxide, 3-carboxypropyonyl peroxide, acetyl peroxide azobisisobutyramidine dihydro chloride, azobisisobutyronitrile, sodium peroxide, barium peroxide, hydrogen peroxide, potassium persulfate, ammonium persulfate, etc.

The polymerization temperature varies over a wide range according to the kinds of monomers, dispersants and catalysts employed, but in emulsion polymerization a temperature of from 0° to 90° C. is usually employed, although 20° to 80° C. is preferred. An atmospheric pressure or an elevated pressure is usually applied in emulsion polymerization.

As either polymers of the esters of the Formula I-A or the Formula I-B have almost the same characteristics, there is no need to separate the esters of the Formulas I-A and I-B prior to the polymerization thereof even when said esters are obtained in the form of mixture.

The polymers of this invention, including both homopolymers and copolymers, are characterized by the presence of a skeletal chain of fluorinated hydroxyalkyl ester units which can be represented as follows:

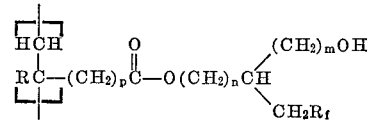

wherein $R_f$, R, m, n and p are as defined above. The homopolymers contain these recurring units attached to one another by the dangling valence bonds shown in the above formula, and the copolymers contain these groups interspersed with groups derived from copolymerizable monomers employed.

The polymers of this invention not only have markedly excellent oil-repellent properties due to a multiplicity of perfluoroalkyl side chains ($R_f$), but they also have specific characteristics due to the presence of reactive hydroxyl side chains. For instance, the polymers of the invention have good affinity for conventional organic solvents as well as fluorinated solvents due to the presence of hydroxyl side chains in the polymer molecules, so that the polymers can be easily dissolved at room temperature or at elevated temperature in one or more species of such conventional organic solvents as acetone, methylethyl ketone and similar ketones, diethylether and similar ethers, etc., as well as such fluorinated solvents as trifluorotrichloroethane, etc., making it possible to extend the fields of application thereof.

Further, various modified polymers having useful properties can be easily obtained by modifying the polymers of the invention with mono- or poly-functional compounds which are reactive with hydroxyl groups. When fibres coated with the polymers of the invention are, for instance, modified with mono-functional compounds having hydrophobic properties, the resultant fibres not only display oil-repellent properties but also excellent water-repellent properties, and when poly-functional compounds are employed as a modifier, cross-linking occurs, whereby there are obtained three dimensional polymers which are insoluble in conventional organic solvents.

Further, when fibres are coated with polymers of the invention the perfluoroalkyl side chain is more effectively orientated on the outer surface of the fibres due to the presence of the hydroxyl groups in the polymer molecules, thereby imparting markedly excellent oil-repellency to the fibres and preventing the accumulation of static electricity on the fibres. In addition to these features, an aqueous emulsion of a polymer of the present invention prepared by emulsion polymerization is very stable due to the presence of the hydroxyl groups in the polymer molecules, thus rendering it possible to employ said emulsion as an oil-repellent composition without any further after-treatment. Also the polymers have good affinity for solid materials such as fibrous or other porous materials, rendering it possible to impart durable oil-repellency to such materials.

It is easily understood by one skilled in the art that these specific characteristics of the polymers of the present invention make them especially suitable for the preparation of oil-repellent compositions.

Oil-repellent compositions containing the polymers of the present invention are of various forms, such as aqueous emulsions, organic solvent solutions or self-pressurized sprayable products, "aerosols." An aqueous emulsion prepared by emulsion polymerization may be advantageously used as it is, or it may be diluted or concentrated. There may be added stabilizers, pH adjusters and/or other water- or oil-repellent compounds known to the art, where necessary. The aqueous emulsion can be also prepared by dispersing powdered polymer in an aqueous medium. An organic solvent solution is prepared by solution polymerization or by dissolving the polymer at atmospheric or elevated temperature in one or more species of such organic solvents as stated before. In the preparation of aerosols, a propellant, such as, dichlorodifluoromethane, monofluorotrichloromethane, dichlorotetrafluoroethane, etc., is added to said solution. The solutions and aerosols can be easily prepared as the polymers of the present invention are soluble in a relatively wide variety of solvents.

The oil-repellent compositions of this invention may be applied to solid materials by painting, dipping or spraying at room temperatures, or at elevated temperatures as is conventional in the art. The materials to be treated include fibrous materials, other porous or nonporous materials such as woven fabrics, knit fabrics, papers, fibreboards, felts, etc. made of natural fibres such as cellulose, cotton, wool, etc., fully synthetic fibres such as polyamides, polyesters, polyacrylonitriles, etc. and/or partially synthetic fibres such as cellulose acetate, cellulose propionate, etc.; leathers; and goods made of glass, woods, etc.

The coated materials thus obtained are dried at room temperature or at elevated temperatures and further, if necessary, a curing process may be applied. During or after the curing, a washing process may also be applied, as required. The drying may be accomplished or accelerated by the application of mild heating (usually 80° C. to 150° C.), a current of air or other inert gas, reduced pressure or by a combination of such means. The curing process is usually required if emulsion-type compositions are used, thereby the polymer particles coalesce with each other to form a continuous polymer layer firmly attached to the coated materials. Said process is carried out by heating the materials at 80° to 200° C., preferably at 100° to 150° C., for 1 to 20 minutes. The washing process is also required in using emulsion-type compositions, if necessary, whereby dispersants and polymerization initiators contained in emulsions are washed out. Said process is usually carried out by washing the materials with a 0.1– 0.5 weight percent aqueous solution of a neutral detergent at 40°–60° C. for 10 seconds to 5 minutes. There is no need, as a rule, to apply said curing and washing processes, if solution-type or aerosol-type compositions are used.

The aforementioned treating methods are illustrative only and we do not intend to limit this invention to the same, as there are various other modifications which are readily apparent to those skilled in the art.

The thus treated materials, which are coated with the polymers of this invention, display markedly excellent oil-repellent properties due to the perfluoroalkyl side chain ($R_f$) exposed on the outer surface of the treated materials. For instance, drops of oil placed on the surface will remain or run off rather than spreading and wetting the surface. This excellent oil-repellent property is secured when the polymer of this invention is attached to the materials in the range of only from 0.1 to 5 weight percent based on the weight of the materials, although said oil-repellent property will increase if a great amount of polymer is attached.

The polymers of this invention may be modified with various modifiers by utilizing the reactive hydroxyl side chain, so as to impart various other useful properties to the polymers. Said modifiers include those mono- or poly-functional compounds which are reactive with hydroxyl groups. The poly-functional compounds are (1) polyisocyanates such as tolylene diisocyanate, hexamethylene diisocyanate, hexahydrobiphenyl 4,4-diisocyanate, 3,5-diisocyanate benzotrifluoride, etc.; (2) triazines such as cyanuric chloride, 2,4-dichloro-6-phenoxy-S-triazine, 2,4- dichloro-6-butoxy-S-triazine, 2,4-dichloro-6-(1,1-dihydropentadecafluorooctoxy)-S-triazine, etc.; (3) methylolmelamine or polyethylene imide derivatives, such as, 3,3-diethylene-1,1-hexamethylene diurea, etc.; and (4) similar compounds. The mono-functional compounds are octadecyl isocyanate, meta-trifluoromethyl-phenyl isocyanate, n-octadecyl-N,N-ethylene urea, stearamide methyl pyridinium chloride, 1-octadecyloxymethyl pyridinium chloride, stearic chloride, stearic anhydride, perfluorobutyric chloride, etc. The most desirable mono-functional compounds are quaternary pyridinium salts having a higher alkyl group of 12 to 20 carbon atoms, such as,

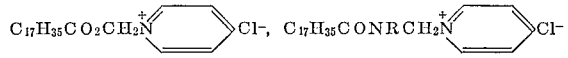

and

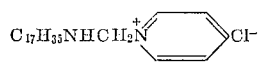

etc., which are known to the art as a water-repellent and available under the trade names "Norane R" (trademark of Warwick Chemical Co., U.S.A.), "Zelan AP" (trademark of E. I. du Pont de Nemours & Co., U.S.A.) and "Velan PF" (trademark of Imperial Chemical Industries Ltd, U.K.).

When a mono-functional compound is employed as a modifier, the properties of the compound are imparted to the polymer modified therewith. The polymer modified with a compound having hydrophobic properties, for instance, displays water-repellency as well as oil-repellency. The solubility or durability of the polymers with respect to solvents or detergents and other properties may be also changed according to the kinds of the compound used as a modifier. Alternatively, when a poly-functional compound is employed as a modifier, cross-linking occurs and the resultant three-dimensional polymer thereby becomes insoluble in organic solvents and the durability of the polymer with respect to washing and dry-cleaning increase. A polymer modified with a poly-functional compound having hydrophobic properties also displays excellent water-repellency as well as oil-repellency.

The modifying process may be preferably applied before or after the oil-repellent treatment by double bath treatment, although it is also applicable during the course of the oil-repellent treatment by single bath treatment. When the modifying process is applied after the oil-repellent treatment, the materials which have been pretreated with the oil-repellent compositions are dipped in or sprayed with the modifier in the form of a solution, emulsion or aerosol. The conditions employed in said modifying process may be adequately selected according to the kinds of modifiers and polymers used, and the time of modifying treatment, but usually said process is carried out between room temperature and 150° C. under atmospheric pressure. Suitable additives may be included in the modifying agents according to the kinds of byproducts produced by the reaction of the hydroxyl group of the polymers with the modifiers. For example, acid acceptors are added if acidic substances are produced as byproducts.

EXAMPLE 1

(This example provides a detailed illustration of the production of the monomer,

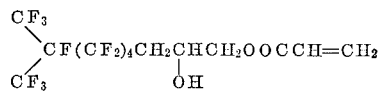

by Process I and polymers prepared therefrom.)
(1) Production of the starting compound,

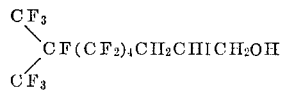

682 grams (1.377 mole) of

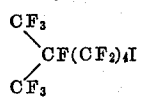

were placed in a 500 milliliter 4-necked flask equipped with a reflux condenser, thermometer, dropping funnel, nitrogen gas injector and agitator and the temperature in the flask was gradually elevated to 50° C., with stirring in a nitrogen stream introduced from the injector. At such temperature, a suspension prepared by suspending 3.39 grams of azobisisobutyronitrile in 40.0 grams of allyl alcohol was added dropwise. A violent exothermic reaction occurred immediately and the reaction system was cooled with water as required. After 1.5 hours when generation of heat due to the exothermic reaction was terminated, a further quantity of azobisisobutyronitrile in the form of a suspension prepared by suspending 1.4 grams of azobisisobutyronitrile in 24.0 grams of allyl alcohol was added to the reaction system and the mixture stirred at 70–82° C. for 1 hour and 20 minutes. Thereafter, in addition, a suspension prepared by suspending 0.85 gram of azobisisobutyronitrile in 16.0 grams of allyl alcohol was added to the system and the mixture stirred at 77–80° C. for 3 hours. The resultant reaction mixture was cooled to room temperature and filtered to remove solid materials, such as residue of the catalyst employed. The filtrate was distilled under reduced pressure to remove unreacted starting materials, yielding 681 grams of a product,

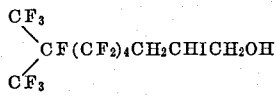

as a distillate boiling at 88–90° C./1.3–1.5 mm. Hg.

Analysis gave the following values: Found: C=20.2%, F=50.9%, I=23.0%, H=1.17%. Calculated $(C_{10}F_{15}H_6OI)$

C=21.6%, F=51.4%, I=22.9%, H=1.08%.

Infrared absorption spectra showed the presence of —OH, —CH$_2$—, CF$_3$ and —CF$_2$— bonds.

(2) Production of the compound,

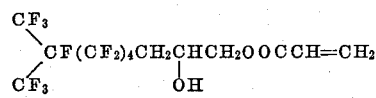

(2–a) 520 grams of

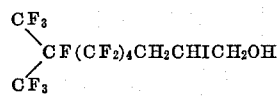

210 grams of potassium acrylate (CH$_2$=CHCOOK), 650 grams of H(CF$_2$)$_4$CH$_2$OH, 935 grams of allylalcohol and 5 grams of hydroquinone were placed in a 3 liter 4-necked flask equipped with a reflux condenser, thermometer and agitator and the mixture was maintained with thorough stirring under reflux temperature for 6 hours after which it was cooled to room temperature and filtered to remove solid materials contained therein. Then allylalcohol was recovered by distillation and the residue was dissolved in trifluorotrichloroethane (C$_2$Cl$_3$F$_3$). The solution was filtrated to remove insoluble solid materials and washed with water and dried with anhydrous sodium sulfate.

By rectification thereof, the solvents, H(CF$_2$)$_4$CH$_2$OH and C$_2$Cl$_3$F$_3$, were recovered and 390 grams of colorless transparent viscose liquid boiling at 102–103° C./2.5 mm. Hg, 43 grams of a lightly yellowish viscous liquid boiling at 103–150° C./1.5–2.5 mm. Hg and 35 grams of residue were obtained.

Said distillate of 102–103° C./2.5 mm. Hg boiling point was found by gas chromatographic analysis to consist almost of a single substance. By infrared spectroscopic analysis the following results were observed:

Absorption due to —OH at 3.05μ; —CH$_2$— at 3.45μ;

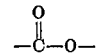

at 5.86μ; —CH=CH$_2$ at 6.13μ and

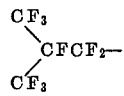

at 7.7–8.7μ and 10.19μ, and by elementary analysis the following results were obtained: C=32.9%, F=57.0%, H=1.7%, O=8.4%. (Calculated value of the compound, C$_{13}$F$_{15}$H$_9$O$_3$ are: C=31.3%, F=57.2%, H=1.8%, O=9.7%.)

Thus said substance was confirmed to be

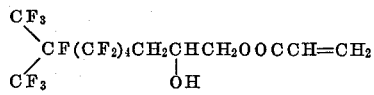

The other distillate of 103–150° C./1.5–2.5 mm. Hg was found to contain 5 components by gaschromatographic analysis and by infrared spectroscopic analysis thereof the following absorptions were found:

Absorption due to —OH at 3.05μ; —CH$_2$— at 3.47μ;

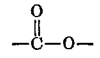

at 5.86μ and

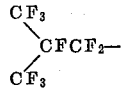

at 7.8–8.76μ and 10.22μ, but no absorption was found due to —CH=CH$_2$.

Thus said distillate was confirmed to be mixture of low molecular weight polymers of said desired compound.

In said residue there was found some polymer of

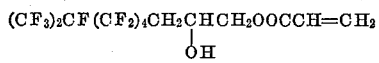

but as to other impurities therein nothing was confirmed.

(2–b) 100 grams of

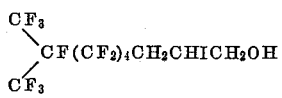

40 grams of CH$_2$=CHCOONa, 320 grams of dioxane and 1 gram of hydroquinone were placed in a 700 milliliter stainless-steel autoclave and the air in the autoclave was thoroughly replaced with nitrogen gas and then the mixture was shaken at 130° C. for 10 hours.

67 grams of the product,

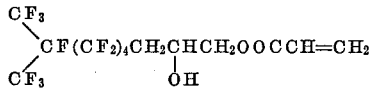

were obtained by being separated from the resultant reaction mixture in the manner as described in the above method (2–a).

The identification of this compound was confirmed by elementary analysis, infrared spectroscopic analysis and programmed temperature gaschromatographic analysis.

(3) Polymer.

(3–a) Homopolymer.—50 grams of

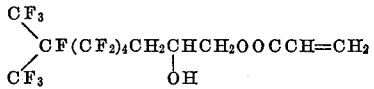

650 grams of deoxygenated water, 15 grams of acetone and 5 grams of CF$_3$(CF$_2$)$_6$COONH$_4$ were placed in the sequence abovementioned in a 1 liter 4-necked flask equipped with a refux condenser, thermometer, dropping funnel and agitator and thoroughly mixed with stirring in a nitrogen stream at room temperature to form a homogeneous mixture.

Then the reaction system was further stirred slowly and gradually heated up to 40–55° C. and then an aqueous solution prepared by dissolving 3 grams of potassium persulfate in 50 grams of deoxygenated water was added dropwise slowly, and on completion of the addition the system was further heated up to 62–70° C. and thoroughly stirred for 3 hours and 50 minutes at such temperature. There was obtained a milky-colored stable polymer emulsion having a concentration of 6.3 weight percent. The identification of the polymer was confirmed by infrared spectroscopic analysis and elementary analysis.

After the resultant emulsion was diluted to 0.9 weight percent with water, cotton gauze and nylon cloth, each about 10 cm. x 10 cm., were immersed therein. The gauze and cloth after being lightly squeezed and dried in the air were further heated in a hot air stream of 150° C. for 5 minutes to cure the polymer attached thereon, and then thoroughly washed with about 500 milliliters of warm water 3 times, and finally dried in an electric drier at 70–80° C.

The gauze and cloth thus treated exhibited no changes in their handle and color properties and little change in strentgh, but exhibited water-repellency and extremely high oil-repellency, sustaining drops of a 10:90 volume ratio mixture of liquid paraffin and n-heptane as well as n-octane and tetrachloroethylene without any infiltration for more than 24 hours.

Another treatment was run in the following manner by employing 2 baths: the first bath consisting of a mixture of 900 milliliters of distilled water, 20 grams of said polymer emulsion of concentration 6.3 weight percent, 40 milliliters of isobutylalcohol, 1 gram of "Scourol 100" (trademark for nonionic surfactant (polyoxyethylene lauryl ether), of Kao Soap Co., Ltd., Japan), 3 grams of sodium acetate and 2.5 grams of acetic acid; the second bath consisting of a mixture of 60 grams of "Zelan A.P." (trademark for water-repellent $$(C_{17}H_{35}CONRCH_2NC_5H_5)^+Cl^-)$$

of E. I. du Pont de Nemours & Co., U.S.A.), 10 grams of "Sumitex resin M–3" (trademark for precondensate of melamine resin of Sumitomo Chemical Co., Ltd., Japan), 1 gram of "Sumitex ACX" (trademark for curing agent of Sumitomo Chemical Co., Ltd., Japan), 12 grams of sodium acetate and 917 grams of distilled water.

A nylon cloth was immersed in said first bath, then predried at 80–85° C. for 7 minutes and dried at 140° C. for 2 minutes, and then it was thoroughly washed at 40° C. for 20 seconds in an aqueous solution of 0.5 weight percent of a neutral detergent and 0.2 weight percent of soda ash. After thoroughly drying the sample again it was immersde in said second bath, and similarly dried and washed. The nylon cloth thus treated exhibited extremely high water-repellency, showing 100 marks by AATCC Spray Test 22–1952. It also completely repelled drops of soy, vodka, wine, machine oil, liquid paraffin, n-octane, n-decane and tetrachloroethylene.

(3–b) Copolymer with methyl methacrylate.—In the manner same as for the above-mentioned homopolymer (3–a), a mixture of 55 grams of

5 grams of $CH_2=C(CH_3)COOCH_3$, 750 grams of deoxygenated water, 25 grams of acetone, 15 grams of $$(CF_3)_2CF(CF_2)_4COONH_4$$

as an emulsifier and a solution prepared by dissolving 3 grams of potassium persulfate in 47 grams of deoxygenated water was thoroughly stirred in a nitrogen stream for 4 hours at 60–68° C. whereby there was obtained 897 grams of a milky-colored polymer emulsion having a concentration of 6.5 weight percent.

After the resultant emulsion was diluted with water to the order of 0.75 weight percent, a nylon cloth was immersed for 3 minutes, then lightly squeezed, dried in the air and further dried in hot air of 130° C. for about 10 minutes. The treated cloth was thoroughly washed with a 0.5 weight percent aqueous solution of a neutral detergent, then further washed with water, and squeezed and thoroughly dried in hot air for 3 hours.

The nylon cloth thus treated exhibited almost no changes in handle, strength, etc., by the treatment, but sustained drops of liquid paraffin without any infiltration for more than 3 days.

(3–c) Copolymer with $CH_2=CHCOOC_7H_{15}$—85 grams of

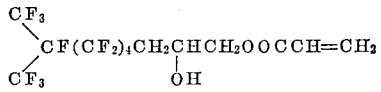

5 grams of $C_7H_{15}OOCCH=CH_2$, 1 liter of deoxygenated water, 10 grams of $CF_3(CF_2)_6COONH_4$ and 35 grams of acetone were placed in a 2 liter 4-necked flask equipped with a reflux condenser, thermometer, dropping funnel and agitator and the mixture thoroughly stirred in a nitrogen stream at room temperature, then heated with stirring at 60–70° C. for 5 hours, while slowly adding a solution prepared by dissolving 6 grams of ammonium persulfate in 200 grams of deoxygenated water. In about 10 minutes after having added said ammonium persulfate the reacted mixture exhibited a milky fluorescent color which darkened with the progress of the polymerization to a final opaque emulsion.

The emulsion thus obtained had a polymer concentration of 6.6 weight percent and exhibited no precipitate 5 months after the preparation thereof and was highly stable.

Then 200 grams of the resultant emulsion were placed in a beaker, and the water and acetone contained therein were evaporated whereby 13 grams of a resin-like polymer containing the emulsifier were obtained which was first thoroughly washed with warm water at 40–50° C., manually torn, and then fully dried. Thereafter it was dissolved in 50 milliliters of $C_2Cl_3F_3$. The solution was dried with anhydrous sodium sulfate and after filtering, slowly dropped in hot water at 80–90° C. whereupon the $C_2Cl_3F_3$ evaporated and a resin-like polymer of light yellow color rose to the surface of the hot water. Said polymer was thoroughly washed with methanol after which it was dried in a drier under reduced pressure until it attained a constant weight. It was analyzed by infrared spectroscopic analysis and elementary analysis with the following results:

Infrared absorption due to —OH at 3.05μ; —CH$_2$— at 3.45μ;

at 5.75–5.81μ; and

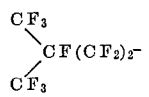

at 7.7–8.9μ and 10.2μ, and upon comparison with the absorption of the monomers, no absorption due to —CH=CH$_2$ was found which, if present should have been found at or near 6.15μ.

By elementary analysis it was found that said polymer contained about 0.5 percent of hydrogen in excess as compared with the homopolymer of

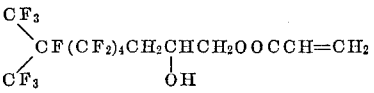

From the results of the analysis the polymer obtained was confirmed to be a copolymer of

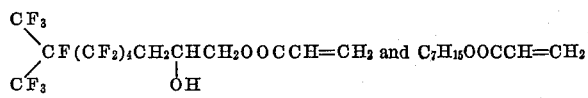 and C₇H₁₅OOCCH=CH₂

A cotton gauze which was treated in said copolymer emulsion thus prepared in a manner similar to that for the homo-polymer (3–a) as above, exhibited excellent oil-repellency, completely repelling drops of a 10:90 volume ratio mixture of liquid paraffin and n-heptane as well as n-octane.

(3–d) *Homopolymer.*—200 grams of deoxygenated water, 6 grams of n-cetane, 3 grams of $$(CF_3)_2CF(CF_2)_4COONH_4$$

13 grams of

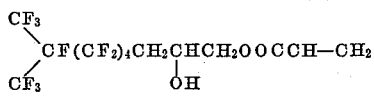

and 10 grams of acetone were placed in a 500 milliliter stirring autoclave and the air in the autoclave was thoroughly replaced with nitrogen.

Then the autoclave was placed at a distance of 1 meter from a source of γ-rays of Co⁶⁰ and irradiated under a dose rate of 8×10⁴ r./hr. with stirring for 1 hour at room temperature. Reaction pressure showed almost no change during the irradiation and the pressure gauge indicated 0. After 1 hour irradiation by γ-rays of Co⁶⁰ the system was further left to polymerize for about 30 minutes whereby a stable emulsion having a polymer concentration of 5.7 weight percent, and being light yellow in color was obtained. The polymer contained therein was confirmed to be a homopolymer of

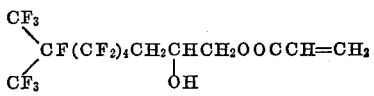

by infrared spectroscopic analysis and elementary analysis.

The emulsion thus prepared was diluted with water to a concentration of about 1 weight percent, and a cotton cloth was immersed in such emulsion at room temperature for 3 minutes, then lightly squeezed and dried in air, and further dried at 150° C. for 6 minutes. The treated cloth was then washed with about 1 liter of a 0.5 weight percent aqueous solution of a neutral detergent and again dried at 90–100° C.

The cotton cloth thus treated exhibited extremely excellent oil-repellency, and did not permit any infiltration of machine oil and kerosene oil, and sustained the drops of a 20:80 volume ratio mixture of liquid paraffin and n-heptane for more than 24 hours.

Cotton gauze, nylon cloth and wool gabardine similarly treated also exhibited excellent oil-repellency without being changed by the treatment as to their handle and color, sustaining drops of n-octane and tetrachloroethylene.

35 grams of the cotton cloth thus treated and 1 liter of ether were placed in a 2 liter, 3-necked, separable reaction flask, and the system was cooled to −10° C. with Dry Ice-methanol bath with a slow stirring. After about 10 minutes of the cooling operation, 10 grams of cyanuric chloride dissolved in 100 grams of anhydrous ether were added dropwise to the system through a dropping funnel for 40 minutes, then the system was warmed with stirring to room temperature for about 2 hours and further heated to reflux temperature for 2 hours. The treated cotton cloth, taken out and dried exhibited a somewhat coarser handle but by further heating in hot air at 130° C. for 10 minutes, and washing twice with 1 liter of warm water containing 0.3 weight percent of a neutral detergent, and then with 2 liters of cold water 5 times and drying finally, it recovered a softer handle. The cotton cloth thus treated exhibited extremely high water repellency and oil repellency, showing 100 marks by AATCC Spray Test 22–1952 and repelling drops of n-octane and n-decane without any infiltration.

EXAMPLE 2

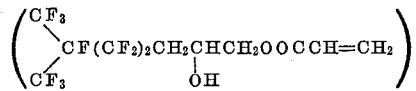

and a homopolymer thereof).

100 grams of

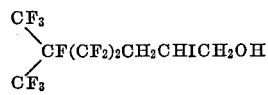

35 grams of CH₂=CHCOOK, 300 grams of tertiary amyl-alcohol and 0.3 gram of hydroquinone were placed in a 1 liter 4-necked flask equipped with a reflux condenser, thermometer and agitator and the mixture was heated with stirring at 93–100° C. for 10 hours, then cooled to room temperature. Thereafter the resultant mixture was poured into about 2 liters of water to separate the oil layer and then the water layer was extracted with tertiary amyl-alcohol, and said extract was mixed with said oil layer and dried with anhydrous magnesium sulfate for 24 hours. By rectification, 15 grams of the unreacted $$(CF_3)_2CF(CF_2)_2CH_2CHICH_2OH$$

were recovered, and 70.5 grams of a colorless transparent viscous liquid boiling at 68–71° C./0.5 mm. Hg were obtained.

The latter compound was confirmed by infrared spectroscopic analysis to have absorption due to —OH at 3.05μ; —CH— at 3.47μ;

at 5.87μ; —CH=CH₂ at 6.12μ;

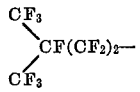

at 7.6–8.7μ and 10.20μ. The presence of a double bond was also confirmed by bromine addition.

The results of elementary analysis: C=33.8%, F=50.9%, H=2.50%, O=12.8%. (Calculated values of the compound, C₁₁F₁₁H₉O₃: C=33.2%, F=52.6%, H=2.25%, O=12.05%.)

Thus the above product was confirmed to be

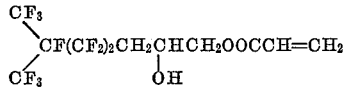

60 grams of

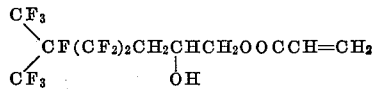

700 grams of deoxygenated distilled water, 50 grams of acetone and 15 grams of CF₃(CF₂)COONH₄ were placed in a 1 liter 4-necked flask equipped with a reflux condenser, the air in which flask had been thoroughly replaced by nitrogen gas, and the mixture was gradually heated with stirring in a nitrogen stream. When the temperature in the flask rose to about 50° C., a solution of 3.0 grams of potassium persulfate in 50 milliliters of deoxygenated distilled water was added incrementally to the reaction system by the time the temperature of the system rose to 60° C., then the system was maintained at 70° C. for 5 hours and 40 minues with slow stirring to complete the polymerization. Thus a stable polymer dispersion having a concentration of 6.7 weight percent was obtained.

Methanol was added to a part of the dispersion and violently stirred to coagulate the polymer. The polymer deposited was washed with methanol and dissolved in $C_2Cl_3F_3$. The solution was poured into cold water and heated to evaporate $C_2Cl_3F_3$. Removal of $C_2Cl_3F_3$ gave a precipitate of the polymer free from water-soluble impurities. The polymer precipitate was washed with methanol again and dried in a drier under reduced pressure until the weight of the polymer indicated constant value. The polymer thus purified was a white elastomer. By infrared spectroscopic analysis, absorption of said polymer quite resembled that of the monomer, but no absorption due to —CH=CH$_2$ at or near 6.12μ was observed to prove the product to be a homopolymer of said monomer.

Said emulsion was diluted with water to the order of 0.85 weight percent. A cutting of cotton cloth was immersed in such diluted emulsion, then taken out, lightly squeezed, dried in hot air at 80–90° C. further heated at 140° C. for 7 minutes to cure the polymer attached thereon, washed in 0.5 weight percent aqueous solution of neutral detergent, then thoroughly rinsed with water and dried.

The cotton cloth thus treated exhibited an excellent oil-repellency, sustaining drops of machine oil without any infiltration for more than 5 hours.

Further, by immersing a filter paper in said diluted emulsion followed by drying in hot air at 140° C., the filter paper thus treated definitely repelled drops of a 50:50 volume ratio mixture of liquid paraffin and n-heptane, and no trace of the mixture remained on the surface when it was wiped off with a blotting paper.

EXAMPLE 3

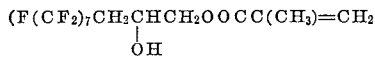

and a homopolymer thereof).

In the similar manner to Example 1(2–a) 56 grams of F(CF$_2$)$_7$CH$_2$CHICH$_2$OH, 18 grams of $$CH_2=C(CH_3)COOK$$

250 grams of isoamylalcohol and 1 gram of hydroquinone were heated with stirring at 120–122° C. for 8 hours whereby 43.5 grams of

were obtained as a distillate with a boiling point of 105–107° C./1.0–1.2 mm. Hg.

43 grams of

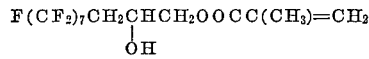

and 270 grams of $C_2Cl_3F_3$ were placed in a 300 milliliter, 4-necked flask equipped with a reflux condenser, nitrogen gas injector, dropping funnel and agitator and violently stirred in a nitrogen stream and irradiated by ultra-violet rays, 400 watts, placed at a distance of 40 cm. from the central part of the flask. During the irradiation, $C_2Cl_3F_3$ evaporated so that it was occasionally added through the dropping funnel to the reaction system as required. After 21 hours of irradiation of with the ultra-violet rays, 318 grams of a polymer solution were obtained which was light yellow in color with a high viscosity.

Part of the solution thus obtained was further diluted with $C_2Cl_3F_3$ to a polymer concentration of 1.0 weight percent, and a cotton gauze and nylon cloth were immersed in such solution. Then the gauze and cloth were taken out and dried at room temperature. The treated gauze and cloth exhibited extremely excellent oil repellency, sustaining drops of frying oil and n-decane without any infiltration for several days.

The nylon cloth thus treated was placed in a 4 liter 4-necked flask together with 800 milliliters of acetone and 200 milliliters of water, and while cooling it with ice-water with slow stirring, a suspension of 50 grams of cyanuric chloride in a mixture of 300 milliters of acetone and 500 grams of ice-water was added, and further continuing cooling and while stirring, a 10 percent solution of sodium carbonate was incrementally added so as to maintain a pH of 6–7.

Said reaction lasted for 6 hours after which said nylon cloth was taken out and washed with water, then with a 0.3 weight percent aqueous solution of a neutral detergent, and washed with water again, and finally dried in a drier for 5 hours and 40 minutes at 80–90° C., and heated for 2.5 minutes at 150° C. The nylon cloth thus treated slightly lost strength, but exhibited almost no changes in handle and color and indicated 100 marks by AATCC Spray Test 22–1952, completely repelling drops of a 10:90 volume ratio mixture of liquid paraffin and n-heptane without any infiltration.

EXAMPLE 4

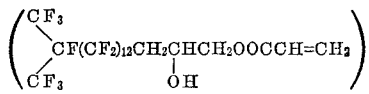

and a homopolymer thereof.

48 grams of

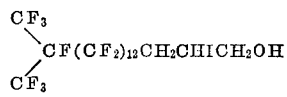

19 grams of CH$_2$=CHCOOAK, 300 grams of n-octanol and 0.48 gram of hydroquinone were placed in a 500 milliliter 3-necked flask equipped with a reflux condenser, thermometer and agitator and the mixture was stirred at 150 to 160° C. for 5 hours. The resultant mixture was cooled to room temperature, and then distilled under reduced pressure to recover the n-octanol contained therein. The residue was washed with 600 grams of cold water 3 times, whereby an oily dark brown liquid was obtained. The liquid was dried with anhydrous magnesium sulfate, and then fractionally distilled yielding a viscous slightly yellowish liquid boiling at 133–136° C./0.22–0.25 mm. Hg. By infrared spectroscopic analysis thereon, absorptions were observed due to —OH at 3.00μ, due to —CH$_2$— at 3.43–3.49μ, due to

at 5.90μ and due to —CH=CH$_2$ at 6.15μ respectively.

The results of elementary analysis: C=29.3%, F=63.9%, H=1.20%, O=5.6%. Calculated values for $C_{21}F_{31}H_9O_3$: C=28.1%, F=65.5%, H=1.0%, O=5.4%.

Thus, the substance was confirmed to be:

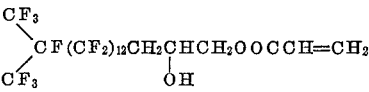

15 grams of

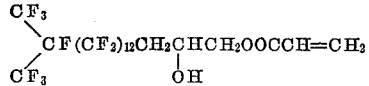

250 milliliters of deoxygenated distilled water and 3 grams of polyoxyethylene octylphenyl ether (H.L.B. 17.2) were placed in a 500 milliliter 4-necked flask with a reflux condenser and the mixture was stirred in a nitrogen stream at 50–60° C. for 30 minutes during which the air in the autoclave was replaced with nitrogen gas. A solution of 1.5 grams of ammonium persulfate in 50 milliliters of deoxygenated distilled water was added to the reaction system and the system was stirred at 65–70° C. for 5 hours, yielding a light yellowish emulsion containing 4.7 weight percent of polymer. The identification of the polymer was confirmed by infrared spectroscopic analysis and elementary analysis.

A part of the polymer emulsion thus prepared was diluted with water to a polymer concentration of 1 weight percent. A nylon twill and cotton gabardine were immersed in such diluted emulsion, taken out, dried in air and heated to cure the polymer attached thereon at 130° C.

for 3-5 minutes. Then the samples thus treated were further treated with the second bath described in Example 1(3-a).

The samples thus treated exhibited 100 marks in water-repellency by AATCC Spray Test 22–1952, and sustained drops of n-decane, n-octane, whisky and ink without any infiltration. No trace remained after wiping off said drops with blotting paper. This water and oil-repellency barely decreased after 3 repeated washings with a neutral detergent.

EXAMPLE 5

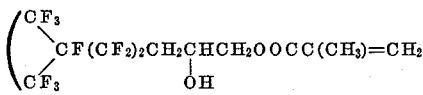

and a copolymer thereof).

By addition-reaction of

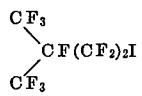

and $CH_2=CHCH_2OH$ in the presence of a catalyst azobisisobutyronitrile under the same conditions as Example 1(1),

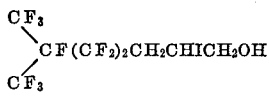

was obtained. In a similar manner as Example 1(2-a), the resultant haloalcohol and

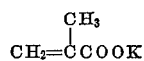

were reacted in anhydrous $H(CF_2)_4CH_2OH$ for 2 hours at 135–140° C., after which the resultant product was separated, and

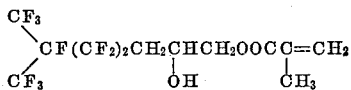

was obtained as a distillate with a boiling point of 83–86° C./0.8–0.9 mm. Hg.

The identification of the product was confirmed by infrared spectroscopic analysis, elementary analysis and programmed temperature gas chromatographic analysis.

412 grams of

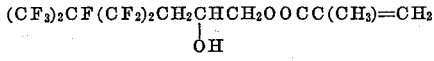

and 15 grams of $CH_2=CHCOOC_3H_7$ were placed in a 500 milliliter stainless-steel autoclave and after replacing the air in the autocalve with nitrogen gas the mixture was shaken at 148–163° C. for 5 days. The resultant viscous mixture was shifted to a distilling flask with 1 gram of hydroquinone for fractional distillation under reduced pressure, and removal of the unreacted monomer gave 28 grams of a brownish fluid of high viscosity. The resultant fluid was dissolved in 100 milliliters of $C_2Cl_3F_3$, and 200 grams of distilled water was added to such solution and thoroughly shaken and water-soluble substances were thoroughly removed after which the water insoluble fraction was treated with active carbon. The resultant substance, almost colorless and transparent was placed in a separating funnel and poured dropwise slowly onto hot water at 80–90° C. The precipitate was washed with methanol whereby a resin-like substance having clayey color was obtained. By infrared spectroscopic analysis and elementary analysis the substance was confirmed to consist of a copolymer of

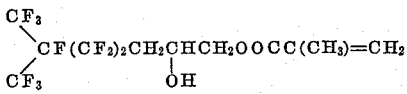

and $CH_2=CHCOOC_3H_7$.

1 gram of the polymer thus obtained was dissolved in 100 milliliters of $C_2Cl_3F_3$. A cotton cloth was immersed in such solution and dried.

The cotton cloth thus treated exhibited excellent oil-repellency, sustaining drops of machine oil and kerosene oil without any infiltration for more than 2 days.

EXAMPLE 6

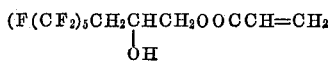

and a homopolymer thereof).

By addition reaction of $F(CF_2)_5I$ and $CH_2=CHCH_2OH$ in the presence of azobisisobutyronitrile under the same conditions as Example 1(1), $F(CF_2)_5CH_2CHICH_2OH$ was obtained. In a similar manner as Example 1(2-a), the resultant haloalcohol was reacted with potassium acrylate in $H(CF_2)_6CH_2OH$ for 2 hours at 140° C., after which the resultant mixture was distilled under reduced pressure, whereby the product

was, obtained as a distillate with a boiling point of 68–710° C./0.8–0.9 mm. Hg.

The identification of this compound was confirmed by elementary analysis, infrared spectroscopic analysis and programmed temperature gaschromatographic analysis.

50 grams of

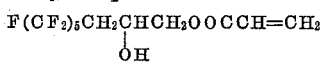

and 500 grams of $C_2Cl_3F_3$ were placed in a 500 milliliter 4-necked flask equipped with a reflux condenser, nitrogen gas injector, dropping funnel and agitator, and the mixture was violently stirred in a nitrogen stream under irradiation of the ultra-violet rays of a 400 watt mercury lamp from a distance of 50 cm. to the center of the flask.

During the irradiation, part of the $C_2Cl_3F_3$ was vaporized, and to supplement this $C_2Cl_3F_3$ was added through the dropping funnel. After 32 hours of the above irradiation, 538 grams of a solution of somewhat high viscosity and light yellow in color was obtained and the polymer contained therein was confirmed to be a homopolymer of said monomer, by infrared spectroscopic analysis and elementary analysis.

A part of the polymer solution thus obtained was further diluted with $C_2Cl_3F_3$ to a polymer concentration of 1.2 weight percent, which was an almost colorless and transparent solution. Said solution was then applied to the inner surface of a clean glass bottle and air-dried and further thoroughly dried in a drier at 80–90° C. to vaporize $C_2Cl_3F_3$. The bottle thus treated remained apparently the same as in the untreated state, but when cotton seed oil was placed in the bottle and then withdrawn, almost no trace of the oil was noticed on the inner wall of the bottle, since the oil had flowed entirely out.

On the other hand, in a test with an untreated bottle, part of the oil remained sticking to the wall and it was difficult to cause it to entirely flow out.

EXAMPLE 7

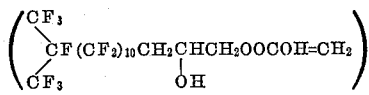

and a homopolymer thereof).

By reacting

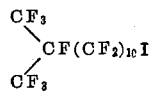

with $CH_2=CHCH_2OH$ in the presence of azobisisobutyronitrile under the same conditions as Example 1(1).

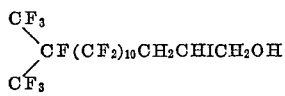

was obtained. The resultant haloalcohol was reacted with $CH_2=CHCOONa$ in anhydrous $H(CF_2)_6CH_2OH$ for 2.5 hours at 140–145° C. in the similar manner as Example 1(2–a). The resultant mixture was diluted with $C_2Cl_3F_3$, the insoluble substance being filtered out, and washed with cold water. Then the oil layer, the $C_2Cl_3F_3$ solution, was dried with anhydrous sodium sulfate, and distilled under reduced pressure to obtain a distillate with a boiling point of 107–113° C./0.1–0.2 mm. Hg. Said distillate was confirmed to be

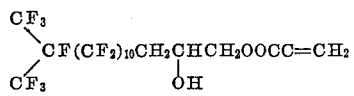

by elementary analysis, infrared spectroscopic analysis and programmed temperature gaschromatographic analysis.

85 grams of

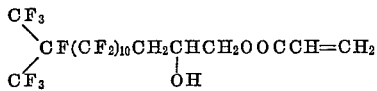

800 grams of deoxygenated water, 45 grams of n-cetane and 3 grams of $(CF_3)_2CF(CF_2)_4COONa$ were placed in a 1 liter stainless-steel autoclave, and the air in the autoclave was thoroughly replaced with nitrogen gas. The mixture was then subjected at room temperature with stirring for 1.8 hours to the irradiation of $Co^{60}$ γ-rays at a dose rate of $7.5 \times 10^4$ r./hr. Reaction temperature and pressure exhibited no changes during the irradiation, maintaining 22° C. and 0 kg./cm.² G. respectively. After the irradiation, stirring was continued for a further 30 minutes and 930 grams of a milky colored and transparent emulsion was obtained. The polymer concentration thereof was 9.0 weight percent.

The resultant polymer was confirmed to be a homopolymer of said monomer by infrared spectroscopic analysis and elementary analysis.

Then 100 grams of the resultant polymer emulsion was placed in a beaker and heated to 50–60° C. under reduced pressure to evaporate the liquid part, whereby a resin-like polymer, brown in color was obtained, which was thoroughly washed with warm water and then dried, then dissolved in 50 grams of $C_2CL_3F_3$.

The resultant solution was placed in a separating funnel and washed with violent shaking with 100 milliliters of distilled water. The $C_2Cl_3F_3$ solution thus produced was slowly dropped onto hot water at 80–90° C. whereby $C_2Cl_3F_3$ was immediately vaporized and there was thus obtained the separated polymer which had an extremely light clayey color. The product was again thoroughly washed with hot water and dried, 1 gram of which was dissolved again in 40 milliliters of $C_2Cl_3F_3$. The solution and 60 milliliters of a 1:1 volume ratio mixture of $CCl_3F$ and $CCl_2F_2$ were made into a self-pressurized sprayable product. The resultant aerosol was applied by spraying to asbestos ceiling board and the soiling properties of the board were extremely reduced as compared with that of the untreated board.

Splashes of frying oil on such a treated ceiling did not infiltrate and could be wiped off without leaving any trace.

EXAMPLE 8

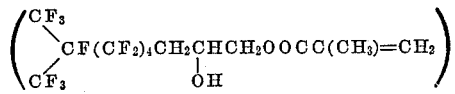

and a homopolymer thereof.

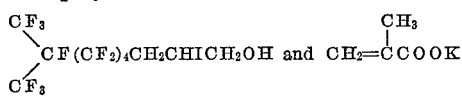

were reacted in anhydrous $H(C_2F_4)_2CH_2OH$ in the presence of hydroquinone, and separated in the same manner as Example 1(2–a), whereby

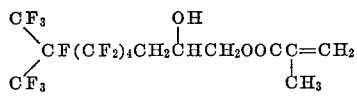

was obtained as a distillate with a boiling point of 119–121° C./2.0 mm. Hg.

The identification of this compound was confirmed by elementary analysis, infrared spectroscopic analysis and programmed temperature gaschromatographic analysis.

Then by irradiation as in Example 7 a dispersion containing a polymer of

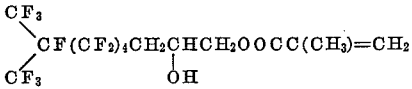

was prepared. To the dispersion was added methanol with shaking to cause coagulation of the polymer. The polymer deposited was washed with warm methanol-water mixture, and thoroughly dried, then dissolved in $C_2F_3Cl_3$ to a polymer concentration of 3 weight percent and put in a pressure bottle into which was injected a liquified gas mixture of $CF_2Cl_2$ and $CFCl_3$ (50:50 by weight) so as to obtain a self-pressurized sprayable product containing 1 weight percent of said polymer.

The aerosol thus obtained was sprayed onto a nylon umbrella cloth 30 cm. x 30 cm. which was then lightly ironed. The cloth thus treated exhibited extremely high oil-repellency, sustaining drops of n-octane without any infiltration. Then the cloth thus treated was dipped in 250 milliliters of anhydrous toluene in a reflux flask to which was then added octadecylisocyanate, and after attaching a reflux condenser equipped with a calcium chloride tube to the flask the contents thereof were heated at reflux temperature for 1 hour. The cloth was taken out and heated to cure the polymer attached thereon in the manner as Example 1(3–a), followed by washing and subsequent drying. The cloth thus treated showed no change in handle, while the strength thereof was somewhat decreased, and it exhibited excellent water-repellency and 100 marks by AATCC Spray Test 22–1952, as well as excellent oil-repellency, permitting no infiltration of drops of n-decane and n-octane. This oil- and water-repellency of the cloth was barely changed after 5 repeated washings with a neutral detergent.

EXAMPLE 9

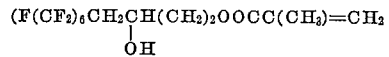

and a homopolymer thereof). 100 grams of

37 grams of

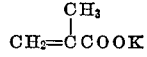

20 grams of $CH_2=CH(CH_2)_2OH$, 100 grams of

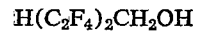

300 milliliters of tertiary amyl alcohol and 0.3 gram of hydroquinone were placed in a 1 liter 4-necked flash equipped with a reflux condenser, thermometer and agitator and the mixture was heated for 6 hours with stirring at 110–115° C.

Then cooled to room temperature, and the resultant reaction mixture was poured into 1 liter of water, the oil-layer was separated, and the water-layer was extracted with tertiary amyl alcohol, and the extract was mixed with the oil-layer. The combined extract was dried with anhydrous magnesium sulfate for 24 hours. By rectification thereof under reduced pressure 32 grams of a substance was obtained as a distillate with a boiling point of 108–112° C./1.0–1.2 mm. Hg. The substance was confirmed by gaschromatographic analysis to be a single component and by infrared spectroscopic analysis, absorptions were observed due to —OH at 3.05μ; —$CH_2$— at 3.47–3.5μ,

at 5.87μ and

at 6.12μ respectively and also due to C–F widely at 7.7–9.0μ.

The results of elementary analysis: C=35.8%,

F=51.3%

H=2.9%, O=10.0%. Calculated values for $C_{14}F_{13}H_{13}O_3$: C=35.3%, F=52.0%, H=2.7%, O=10.0%.

Thus the substance thus obtained was confirmed to be:

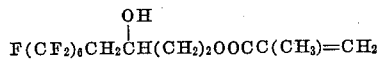

$F(CF_2)_6CH_2CHI(CH_2)_2OH$ employed as the starting material in the above process was obtained by the additional reaction of $F(CF_2)_6I$ and $CH_2=CH(CH_2)_2OH$, the former, $F(CF_2)_6I$ was obtained by telomerization of $CF_3CF_2I$ and $CF_2=CF_2$.

50 grams of

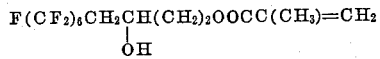

650 grams of deoxygenated distilled water, 15 grams of acetone and 5 grams of $C_7F_{15}COONH_4$ were placed in a 1 liter 4-necked flask equipped with a reflux condenser, thermometer, dropping funnel and agitator and the mixture was thoroughly mixed with stirring in a nitrogen stream, then the stiring was slowed down and the temperature was raised and at 40–55° C., an aqueous solution consisting of 3 grams of potassium persulfate dissolved in 50 grams of deoxygenated water was slowly dropped into the above system. After completing the addition the temperature was further raised to 62–70° C., and stirring continued for 5 hours at such temperature.

The product thus obtained was an extremely stable dispersion having a milky white color and containing 6.3 weight percent of the polymer. To a part of the dispersion there was added methanol and this portion was heated with violent stirring to coagulate a white resin-like solid having a softening point higher than 50° C., and which was in a solvent mixture of acetone and $C_2F_3Cl_3$ at a proportion by volume of 1:3. By infrared spectroscopic analysis, absorption of said solid quite resembled that of the monomer, but no absorption due to

at or near 6.12μ was observed to prove the product to be an addition polymer of said monomer.

An emulsion containing 1 weight percent of said polymer was obtained by diluting said polymer dispersion with water. Cotton poplin and woolen jersey were dipped in said diluted dispersion, then taken out and dried at 100° C. and further heated to cure the polymer at 130° C. for 8 minutes respectively. The cloths thus treated exhibited water-repellency and a somewhat softer handle, and sustained drops of liquid paraffin, machine oil and tetrachloroethylene without infiltration.

EXAMPLE 10

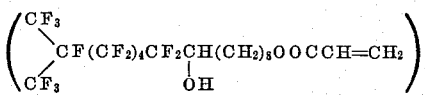

and a homopolymer thereof).

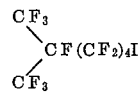

were reacted in the presence of azobisisobutyronitrile in the same manner as Example 1(1), whereby

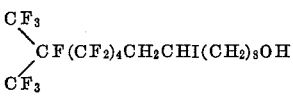

was obtained. Said haloalcohol was reacted with $CH_2=CHCOOK$ in a mixture of anhydrous $H(CF_2)_4CH_2OH$ and $H(CF_2)_4CH_2OH$ $CH_2=CHCH_2OH$ at a ratio of 70:30 by weight, in the presence of hydroquinone under reflux temperature for 8 hours, and the resultant product was separated in a manner as in Example 7 whereby

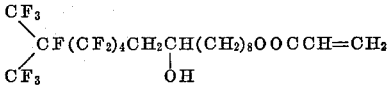

was obtained as a distillate with a boiling point of 127–133° C./0.10–0.13 mm. Hg.

The identification of this compound was confirmed by elementary analysis, infrared spectroscopic analysis and programmed temperature gaschromatographic analysis.

In the same manner as in Example 8, 40 grams of

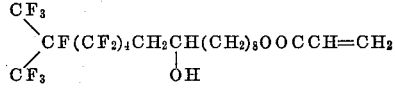

was polymerized under irradiation of γ-rays, and 38 grams of a solid, insoluble in methanol, having a softening point over 40° C. and white in color, was obtained. Infrared spectroscopic analysis of the solid showed almost identical absorptions to the monomer, except that no absorption at or near 6.15μ due to —$CH=CH_2$ was observed, which proved the substance to be an addition polymer of the monomer. Said polymer was soluble in a solvent mixture of $C_2F_3Cl_3$ and acetone at a ratio of 3:1 (by volume).

1 gram of the resultant polymer was dissolved in 10 milliliters of said solvent mixture of $C_2F_3Cl_3$ and acetone and put in a pressure bottle, and there was further added 5 milliliters of an acetone solution containing 0.19 gram of tolylene diisocyanate, then the valve of the bottle was shut and there was injected into the bottle a propellant consisting of a 1:1 weight ratio mixture of $CFCl_3$ and $CF_2Cl_2$ in such an amount that the resultant aerosol solution measured 100 milliliters. The transparent aerosol solution thus prepared showed no changes 1 week after the preparation.

The solution was sprayed on cotton poplin, woolen jersey and nylon broadcloth, and the samples of cloth were left for several minutes to dry at room temperature, then ironed. They generated a peculiar odor of tolylene-diisocyanate at the beginning but it soon vanished.

Each of the samples of cloth exhibited 100 marks in water-repellency by AATCC Spray Test 22–1952, and such oil repellency that each sustained drops of n-decane, n-octane tetrachloroethylene respectively without infiltration.

After 3 repetitions of washing at 50° C. with aqueous solution containing 0.5 weight percent of a neutral detergent and 0.2 weight percent of soda ash for 20 seconds and subsequent rinsing with water, they showed almost no changes in water repellency and oil repellency.

EXAMPLE 11

(This example illustrates the production of the starting compound, $F(CF_2)_8CH_2CHBr(CH_2)_2OH$, the present monomer

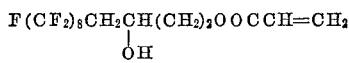

and a homopolymer thereof.)

(1) $F(CF_2)_8CH_2CHBr(CH_2)_2OH$.—280 grams (about 0.5 mole) of $F(CF_2)_8SO_2Br$, 45 grams (about 0.6 mole) of $CH_2=CH(CH_2)_2OH$ and 2 grams of azobisisobutyronitrile were placed in a 300 milliliter 4-necked flask equipped with a stirrer, reflux condenser and thermometer and the mixture was stirred under reflux temperature for 3 hours. Thereafter, a dispersion of 1 gram of azobisisobutyronitrile in 30 grams of $CH_2=CH(CH_2)_2OH$ was further added to the mixture and the system was stirred under reflux temperature for 8 hours. The resultant mixture was fractionally distilled in vacuo, yielding 78 grams of a distillate boiling at 83–88° C./0.8–1.0 mm. Hg.

Analysis gave the following values. Found: C=25.0%, F=56.0%, Br=14.2%, H=1.2%, O=2.6%. Calculated $(C_{12}F_{17}H_8BrO)$: C=25.2%, F=56.2%, Br=14.0%, H=1.4%, O=2.8%.

Infrared absorption spectra showed the presence of —OH, —$CH_2$— and $F(CF_2)_8$— groups.

Thus the substance was confirmed to be $$F(CF_2)_8CH_2CHBr(CH_2)_2OH$$

(2) 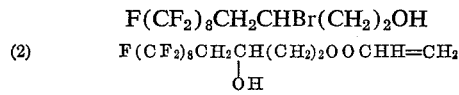

$F(CF_2)_8CH_2CHBr(CH_2)_2OH$ was reacted with $$CH_2=CHOONa$$

at reflux temperature for 6 hours in a 8:2 weight ratio mixture of anhydrous $H(C_2F_4)_2CH_2OH$ and allyl alcohol in the same manner as Example 1(2–a), whereby

was obtained as a distillate with a boiling point of 127–130° C./2.5–2.8 mm. Hg.

The identification of this compound was confirmed by elementary analysis, infrared spectroscopic analysis and programmed temperature gaschromatographic analysis.

(3) Homopolymer.— 70 grams of

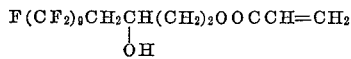

555 grams of deoxygenated distilled water, 15 grams of acetone and 7 grams of 40:1 molar condensation product of ethylene oxide and octylphenol were placed in the same apparatus as in Example 9, and the mixture was thoroughly stirred in a nitrogen stream. Then stirring was slowed down with a gradual rise of temperature, and at 40–55° C. a solution of 3 grams of potassium persulfate in 50 grams of deoxygenated water was slowly added dropwise into the system. After completion of the addition, the reaction continued with stirring for 5 hours at 62–70° C.

The emulsion thus obtained was quite stable, milky white and translucent, containing about 10 weight percent of fine particles. To a part of said dispersion was added methanol to coagulate a resin-like solid substance having a softening point of over 60° C., and being soluble in a solvent mixture of acetone and $C_2F_3Cl_3$. A film of said substance showed almost the same absorption on infrared spectra as the monomer except that no absorption at or near 6.12μ due to —$CH=CH_2$ was observed, proving said substance to be an addition polymer of the above monomer.

20 grams of a paste-state water-repellent, "Zelan AP" (trademark of E. I. du Pont de Nemours & Co., U.S.A.) were added to 100 grams of said polymer emulsion, and thoroughly stirred, and further diluted with water to 1 liter. A cotton poplin, broadcloth of polyester synthetic fibre, nylon twill and woolen jersey were immersed in such diluted dispersion, lightly squeezed, dried at 100° C. and then heated at 130° C. for 6 minutes.

The samples thus treated respectively showed 100 marks of water-repellency by AATCC Spray Test 22–1952, and sustained drops of n-octane and tetrachloroethylene without any infiltration, and after 3 repetitions of washing for 20 seconds at 70° C. with an aqueous solution containing 0.5 weight percent of a neutral detergent and 0.2 weight percent of soda ash, they showed almost no changes in water-repellency and oil-repellency.

EXAMPLE 12

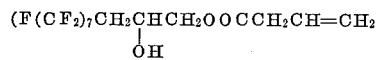

and a homopolymer thereof.)

$F(CF_2)_7SO_2Br$ and $CH_2=CHCH_2OH$ were reacted for 4 hours at 135–140° C. under pressure in the presence of a catalyst mixture of tertiarybutyl hydroperoxide and ditertiary butyl peroxide in the manner as Example 11(1), whereby $F(CF_2)_7CH_2CHBrCH_2OH$ was obtained. The resultant haloalcohol was reacted with $$CH_2=CHCH_2COOK$$

at 110–120° C. for 6 hours in a 7:3 weight ratio mixture of anhydrous $H(C_2F_4)_2CH_2OH$ and isoamylalcohol in the presence of hydroquinone. The resultant product was separated in the same manner as Example 1(2–a), whereby

was obtained as a distillate with a boiling point of 100–112° C./1.5–1.7 mm. Hg.

The identification of this compound was confirmed by elementary analysis, infrared spectroscopic analysis and programmed temperature gaschromatographic analysis.

80 grams of

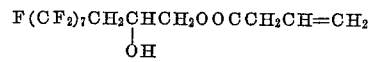

1 liter of deoxygenated distilled water and 10 grams of polyoxyethylenenonylphenyl ether (H.L.B. 17.8) were placed in a 2 liter 4-necked flask equipped with a flux condenser, thermometer, dropping funnel and agitator, and the mixture was thoroughly stirred in a nitrogen stream at room temperature, and after completely replacing the air in the flask with nitrogen, 6 grams of ammonium persulfate dissolved in 200 grams of deoxygenated distilled water were slowly added to the system, and it was stirred for 5 hours at 60–70° C. the polymerization reaction occurred slowly and at the end thereof there was produced a white opaque dispersion which was quite stable and contained 6.0 weight percent of white solid polymer.

The resultant polymer was confirmed to be a homopolymer of the above monomer by elementary analysis and infrared spectroscopic analysis.

Said dispersion was so diluted with water as to prepare a solution containing 1 weight percent of the polymer. A woolen jersey was immersed in such diluted polymer dispersion, and then dried in the air and heated to cure the polymer for 3 minutes at 130° C. The sample exhibited water-repellency as well as excellent oil-repellency, sustaining drops of n-decane without infiltration.

By further treating the above sample in the same manner as in Example 4 with a water-repellant, "Zelan AP" (trademark of E. I. du Pont de Nemours & Co., U.S.A.), its oil-repellency remained unchanged while markedly high water-repellency was found showing 100 marks of water-repellency by AATCC Spray Test 22–1952. Drycleaning of the thus treated sample with trichloroethylene did not deteriorate its performance.

EXAMPLE 13

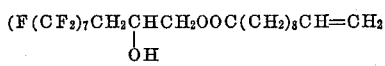

and a homopolymer thereof.)

F(CF$_2$)$_7$I and CH$_2$=CHCH$_2$OH were reacted in the presence of azobisisobutyronitrile in the manner as in Example 1(1), whereby F(CF$_2$)$_7$CH$_2$CHICH$_2$OH was obtained. The resultant haloalcohol was further reacted with CH$_2$=CCH(CH$_2$)$_8$COOK at 120–125° C. for 6 hours in isoamylalcohol in the manner as in Example 1(2–a), and

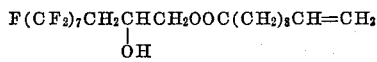

was obtained as a distillate with a boiling point of 137–140° C./0.03–0.04 mm. Hg.

The identification of this compound was confirmed by elementary analysis, infrared spectroscopic analysis and programmed temperature gaschromatographic analysis. The compound,

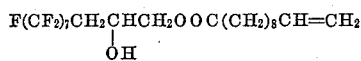

was polymerized by emulsion polymerization under the same conditions as in Example 2, and a stable dispersion containing 6.6 weight percent of the polymer was obtained. The dispersion was then diluted with water to a polymer concentration of 1 weight percent. A nylon twill was immersed in such diluted dispersion, then dried in the air and heated for 5 minutes at 130° C. The treated sample showed excellent oil-repellency, sustaining drops of n-decane without infiltration. The sample thus treated was further dipped in a 0.3 weight percent toluene solution of tolylene diisocyanate, then dried by a steam drier at 100° C., and heated for 3 minutes at 150° C. after which it exhibited excellent water-repellency, making 100 marks by AATCC Spray Test 22–1952, showing no changes in oil-repellency.

Washing of the cloth samples with a 0.5 weight percent aqueous solution of neutral detergent at 50° C. for 1 minute caused no changes in water-repellency and oil-repellency.

EXAMPLE 14

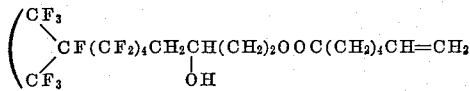

and a homopolymer thereof.)

By addition reaction of

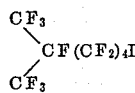

and CH$_2$=CH(CH$_2$)$_2$OH in the presence of azobisisobutyronitrile in the manner as in Example 1 (1),

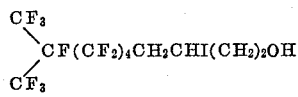

was obtained. The resultant haloalcohol was further reacted with CH$_2$=CH(CH$_2$)$_4$COOK at 120° C. for 5 hours in a 8:2 weight ratio mixture of H(C$_2$F$_4$)$_2$CH$_2$OH and CH$_2$=CH(CH$_2$)$_2$OH, and the resultant product was separated in the manner as in Example 7, whereby

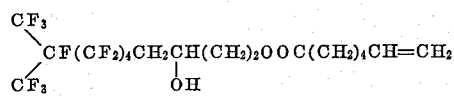

was obtained as a distillate with a boiling point of 120–123° C./.01 mm. Hg.

The compound of the above formula was polymerized by emulsion polymerization under the same conditions as in Example 2, whereby a polymer dispersion containing 6.5 weight percent of the polymer was obtained. The polymer dispersion was diluted with water to 1 weight percent concentration, and a nylon cloth was immersed in such diluted dispersion, dried in the air and heated at 150° C. for 4 minutes. The sample thus treated showed water-repellency and excellent oil-repellency, sustaining drops of n-decane without infiltration.

EXAMPLE 15

(This example illustrates the production of

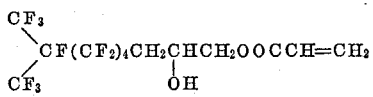

and a homopolymer prepared therefrom.)

(1) Preparation of the starting compound

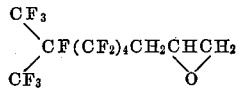

A 1,000 cc. 4-necked flask equipped with a thermometer, agitator, and reflux condenser was charged with 800 g. of

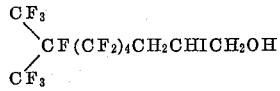

and a solution of 145 g. of NaOH dissolved in 400 g. of water, and then the mixture was reacted at 50–60° C. for 3 hours with stirring. After the reaction the mixture was separated into 2 layers, and the oil layer separated with a separating funnel and washed twice with 500 cc. of water. The water layer was extracted with about 300 cc. of ether twice, and the ether extract was mixed with the oil layer. The resultant mixture was dried with sodium sulfate overnight, and then after distilling the ether the residue was further distilled under reduced pressure, whereby 540 g. of distillate having a boiling point at 55–80° C./5 mm. Hg was obtained.

The distillate was found to be a single substance having purity of more than 99.3% by gaschromatographic analysis, and to consist of the following components by elemental analysis. Found: C=28.1%, F=70.2%, H=1.5%. Calculated (C$_{10}$F$_{15}$H$_5$O): C=28.2%, F=66.9%, H=1.3%.

Further, by infrared spectroscopic analysis of the above substance it was shown that absorption due to —OH present in the starting material at 2.8–3.2$\mu$ had disappeared.

Thus the substance was confirmed to be

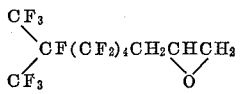

By a similar operation

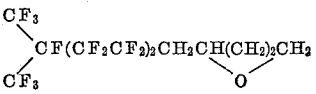

was synthesized from

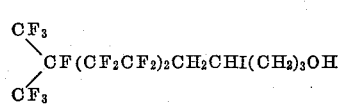

(2) Preparation of

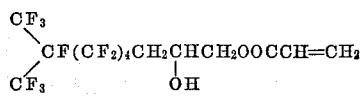

A 200 cc. 4-necked flask equipped with a thermometer, cooler, agitator and nitrogen gas injector was charged with 100 g. of

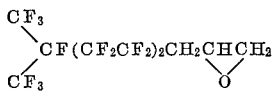

synthesized as above, 17 g. of $CH_2=CHCOOH$, 2.3 g. of benzyldimethylamine and 1 g. of hydroquinone and the system was reacted in a nitrogen stream at 100° C. for 5 hours. Distillation of the resultant reaction mixture under reduced pressure gave 96.3 g. of the main distillate, which was colorless and transparent and viscous, having a boiling point of 102–103.5° C./2.5 mm. Hg. The distillate was found by gaschromatographic analysis to consist of single component, and further by infrared absorption spectrum to show absorptions due to —OH at 3.05μ, due to —$CH_2$— at 3.47μ, due to

at 5.37μ, due to —CH=$CH_2$ at 6.12μ and due to $(CF_3)_2CF(CF_2)_4$— at 7.6–8.7μ and 10.20μ, the above spectra exactly corresponded to those of

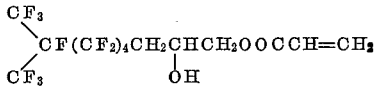

synthesized in Example 1. Further elemental analysis gave the following values: Found: C=30.9%, F=57.2%, H=1.98%. Calculated ($C_{13}F_{15}H_9O_3$): C=31.3%, F=57.2%, H=1.8%.

Thus the substance was confirmed to be

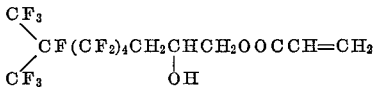

(3) Homopolymer.—50 g. of the fluorinated ester obtained as above was thoroughly washed with water to remove the contained polymerization inhibitor, after which it was dispersed in 450 g. of distilled water in the presence of 1.5 g. of "Nonion HS 240" (trademark of Nonionic surfactant, Nippon Yushi Kogyo Kabushiki Kaisha, Japan), and further potassium persulfate was added. Thereafter the system was heated at 60–70° C. for about 5 hours in a nitrogen stream, whereby a stable milk-white emulsion was obtained. The emulsion was diluted with distilled water to 1 wt. percent polymer concentration, into which a cotton-nylon broadcloth cutting was dipped, and then dried in the air and further cured at 140° C. for 5 minutes. The resultant cloth sustained for more than 24 hours machine oil, kerosene oil and perchloroethylene without penetration, exhibiting excellent oil repellency.

EXAMPLE 16

(Preparation of

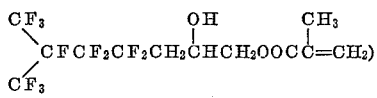

A 200 cc. 4-necked flask equipped with a thermometer, cooler, agitator and nitrogen gas injector was charged with 80 g. of

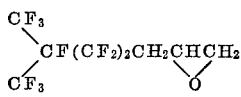

21.1 g. of

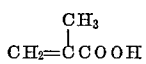

1.5 of potassium hydroxide and 0.8 g. of hydroquinone, and the system was heated in a nitrogen stream at 100° C.

for 3 hours. During the reaction, the contents were somewhat yellowish and became slightly viscous. Part of the product was analyzed by gas chromatographic analysis and found to consist of a single component with negligible residue of the starting material. To remove alkali and polymerization inhibitor, the resultant product was washed twice with warm water at about 60–70° C., and the yellowish tint almost died away to produce 92 g. of a transparent product which was found by infrared spectroscopic analysis to show absorptions due to —OH, —$CH_2$—,

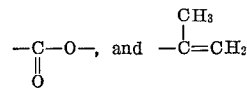

and further by elemental analysis to show the following values: Found: C=34.8%, H=2.8%, F=50.3%. Calculated ($C_{12}F_{11}H_{11}O_3$): C=35.0%, H=2.7%, F=50.7%, and was identified to be

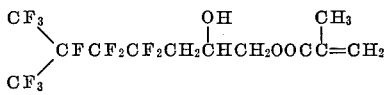

EXAMPLE 17

(Preparation of

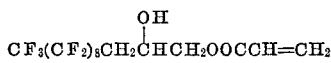

and

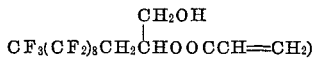

A 200 cc. pressure glass ampoule was charged with 100 g. of

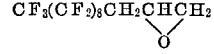

72 g. of $CH_2=CHCOOH$ and 0.5 g. of hydroquinone and the air in the ampoule was replaced by nitrogen gas, the ampoule was melt-sealed and attached to a shaker, then heated at 200° C. by a band heater with violent shaking for 20 hours for reaction. Removal of the unreacted material by distillation under reduced pressure gave 60 g. of a slightly black liquid. Said residue was filtered under reduced pressure, washed with water and dried. By gas chromatographic analysis the resultant substance was found to mainly consist of 2 substances, 76% of substance A and 32% of substance B showing peaks close to each other. The product was separated into the two substances A and B by gas chromatographic analysis. Elementary analysis of these substances gave the following values: Found for substance A: C=30.5%, H=1.3%, F=60.1%. Found for substance B: C=30.5%, H=1.4%, F=59.8%. Calculated ($C_{15}F_{14}H_9O_3$): C=30.1%, H=1.5%, F=60.3%, and they were presumed to be the isomers of

and

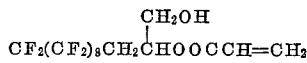

Further by infrared spectroscopic analysis of the substances A and B absorptions due to —OH, —$CH_2$—,

and —CH=$CH_2$ were shown, and such for substance A were identical to those of

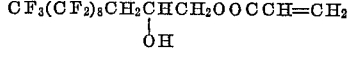

obtained by reacting $CF_3(CF_2)_8CH_2CHICH_2OH$ and $CH_2=CHCOOK$, while substance B had some difference in details, and by nuclear magnetic resonance substance A was observed to be a secondary alcohol and substance B a primary alcohol, thus substance A was confirmed to be $CF_3(CF_2)_8CH_2CH(OH)CH_2OOCCH=CH_2$ and substance B to be $$CF_3(CF_2)_8CH_2CH(CH_2OH)OOCCH=CH_2.$$

The above ester mixture was easily polymerized by emulsion polymerization and cotton cloth treated with an emulsion of the above polymer exhibited excellent water- and oil-repellency.

EXAMPLE 18

(Synthesis of

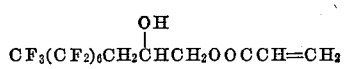

and

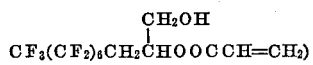

A 100 cc. 4-necked flask equipped with a agitator and thermometer was charged with 100 g. of

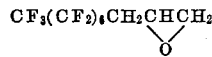

15.9 g. of $CH_2=CHCOOH$, 0.5 g. of hydroquinone, and the mixture was stirred at room temperature after which 0.7 g. of 95% sulfuric acid was added thereto, and heated at 120° C. for 8 hours for reaction. After the reaction the unreacted starting materials were recovered under reduced pressure, whereby 68 g. of the residue, a light brown viscous liquid was obtained. The resultant product was further washed with water and treated with activated carbon whereby 63 g. of a slightly viscous and light brown liquid was obtained.

Said liquid was found by gas chromatographic analysis to consist of 83% of substance A and 15% of substance B with a negligible amount of a byproduct of high boiling point. Both substances A and B were found by infrared spectroscopic analysis to be fluorine containing hydroxy unsaturated esters, and by elemental analysis the following values were found. Found for substance A: C=31.0%, H=1.9%, F=56.5%. Found for substance B: C=31.3%, H=2.0%, F=56.8%. Calculated ($C_{13}F_{15}H_9O_3$): C=31.3%, H=1.8%, F=57.2%.

Further by infrared spectroscopic analysis and nuclear magnetic resonance analysis substance A was confirmed to be

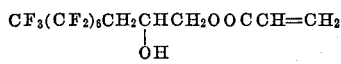

and substance B to be

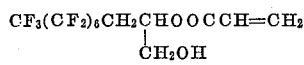

EXAMPLE 19

(Synthesis of

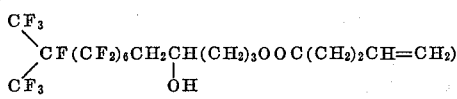

A 200 cc. 4-necked flask was charged with 100 g. of

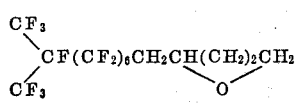

23 g. of $CH_2=CH(CH_2)_2COOH$, 3 g. of NaOH and 0.3 g. of phenyl-β-naphthylamine and the mixture was reacted at 120° C. for 6 hours. The resultant reaction mixture was washed with warm water thoroughly, and 115 g. of a light yellow liquid was obtained. The liquid was found to be almost pure, and not including other impurities, by gaschromatographic analysis and to show absorptions due to the presence of

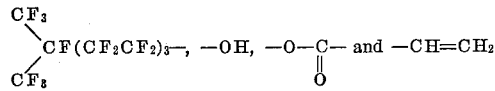

by the infrared spectroscopic analysis, and further by elemental analysis the following values were shown. Found: C=34.6%, H=2.5%, F=55.0%. Calculated $$(C_{19}F_{19}H_{17}O_3)$$

C=34.9%, H=2.6%, F=55.2%.

From the abovve results said compound was confirmed to be

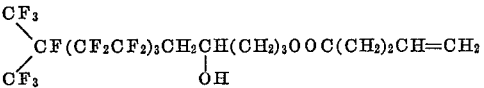

What we claim is:

1. A fluorocarbon compound having the formula:

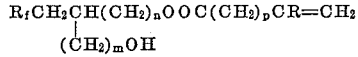

wherein $R_f$ is a perfluoroalkyl group having from 3 to 21 carbon atoms, R is one member of the group consisting of H and $CH_3$, $m$ is an integer of zero to 10, $n$ is zero when $m$ is an integer of 1 to 10 and an integer of 1 to 10 when $m$ is zero, and $p$ is an integer of 0 to 10.

2. The fluorocarbon compound according to claim 1, wherein $m$ is zero and $n$ is an integer of 1 to 10.

3. The fluorocarbon compound according to claim 1, wherein $m$ is an integer of 1 to 10 and $n$ is zero.

4. The fluorocarbon compound according to claim 1 in which $R_f$ is a straight-chain perfluoroalkyl group having from 3 to 21 carbon atoms.

5. The fluorocarbon compound according to claim 1 in which $R_f$ is

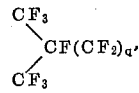

wherein $q'$ is an integer of from 0 to 18.

6. A process for manufacturing the fluorocarbon compound of claim 1, comprising reacting a fluorinated haloalkanol having the formula:

$$R_fCH_2CHX(CH_2)_{m'}OH$$

wherein $R_f$ is a perfluoroalkyl group having 3 to 21 carbon atoms, X is one member of the group consisting of Br and I, and $m'$ is an integer of from 1 to 10, with an unsaturated compound having the formula:

$$CH_2=CH(CH_2)_pCOOM$$

wherein R is one member of the group consisting of H and $CH_3$, M is an alkali metal and $p$ is an integer of from 0 to 10.

7. A solid polymer having a skeletal chain containing fluorinated hydroxyalkyl ester units represented by the formula:

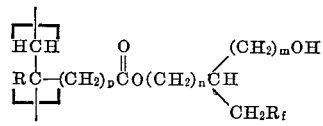

wherein $R_f$ is a fluoroalkyl group having from 3 to 21 carbon atoms, R is one member of the group consisting of H and $CH_3$, $m$ is an integer of 0 to 10, $n$ is zero when $m$ is an integer of 1 to 10 and an integer of 1 to 10 when $m$ is zero, and $p$ is an integer of from 0 to 10.

8. A homopolymer of the fluorocarbon compound specified in claim 1.

9. A copolymer of the fluorocarbon compound specified in claim 1 and a polymerizable comonomer which contains an ethylenic linkage.

10. An aqueous emulsion suitable for rendering solid materials oil repellent, containing the polymer specified in claim 7.

11. An organic solvent solution suitable for rendering solid materials oil repellent, containing the polymer specified in claim 7.

12. A modified polymer resulting from the reaction of hydroxy side chains of the polymer specified in claim 7 with a compound which is reactive with hydroxyl groups.

13. An article coated with the polymer specified in claim 7.

14. An article coated with the polymer specified in claim 12.

References Cited

UNITED STATES PATENTS

| | | |
|---|---|---|
| 2,862,892 | 12/1958 | Hwa. |
| 3,102,103 | 8/1963 | Ahlbrecht et al. |
| 3,277,039 | 10/1966 | Marascia et al. |
| 3,282,905 | 11/1966 | Fasick et al. |
| 3,356,628 | 12/1967 | Smith et al. |

SAMUEL H. BLECH, Primary Examiner

W. J. BRIGGS, Sr., Assistant Examiner

U.S. Cl. X.R.

260—32.8, 33.2, 33.8, 82.1, 85.7, 86.1, 86.7, 89.5, 486; 117—135.5, 139.5, 143, 161